United States Patent [19]
Smith

[11] 3,751,842
[45] Aug. 14, 1973

[54] FISHING LURE
[76] Inventor: Donald K. Smith, 727 W. Outer Dr., Oak Ridge, Tenn. 37830
[22] Filed: July 7, 1971
[21] Appl. No.: 160,373

[52] U.S. Cl. .............................. 43/42.11, 43/42.47
[51] Int. Cl. ............................................ A01k 85/00
[58] Field of Search ....................... 43/42.11, 42.13, 43/42.45, 42.47

[56] References Cited
UNITED STATES PATENTS

| 2,743,545 | 5/1956 | Seneker | 43/42.47 X |
|---|---|---|---|
| 2,604,717 | 7/1952 | Henry | 43/42.47 |
| 2,632,973 | 3/1953 | Pulver | 43/42.47 |
| 2,745,207 | 5/1956 | Akkanen | 43/42.47 |
| 3,141,255 | 7/1964 | Randall | 43/42.11 |
| 1,948,983 | 2/1934 | Danielczuk | 43/42.11 X |
| 3,137,959 | 6/1964 | Wernett | 43/42.13 |

Primary Examiner—Russell R. Kinsey
Assistant Examiner—James H. Czerwonky
Attorney—Colton & Stone

[57] ABSTRACT

There is disclosed a fishing lure having means for oscillating the lure about the longitudinal axis thereof when the lure is pulled through the water. The means for oscillating the lure comprises angularly offset reaction surfaces on different sections of the lure. The lure also comprises means for oscillating the lure transversely of the longitudinal axis thereof when the lure is pulled through the water. The oscillating means operate simultaneously to produce a realistic swimming motion. The two, vertically canted sections of the lure simulate a small minnow in the grasp of a larger minnow.

6 Claims, 4 Drawing Figures

PATENTED AUG 14 1973 3,751,842
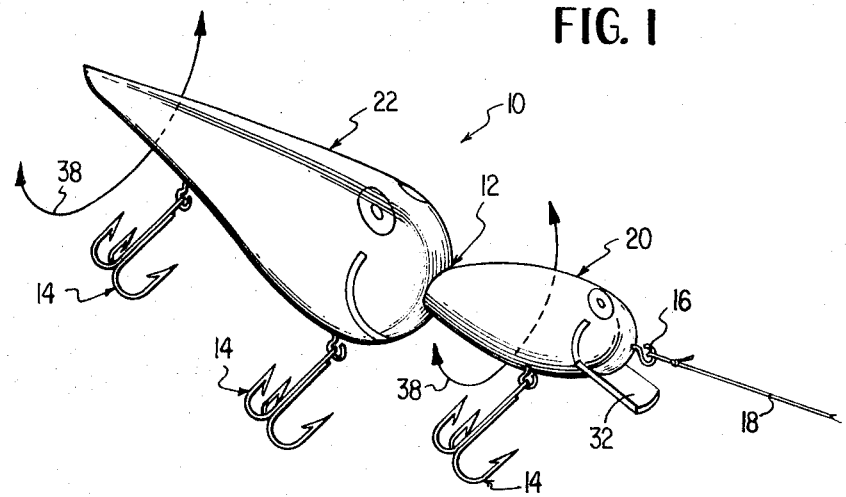
FIG. 1
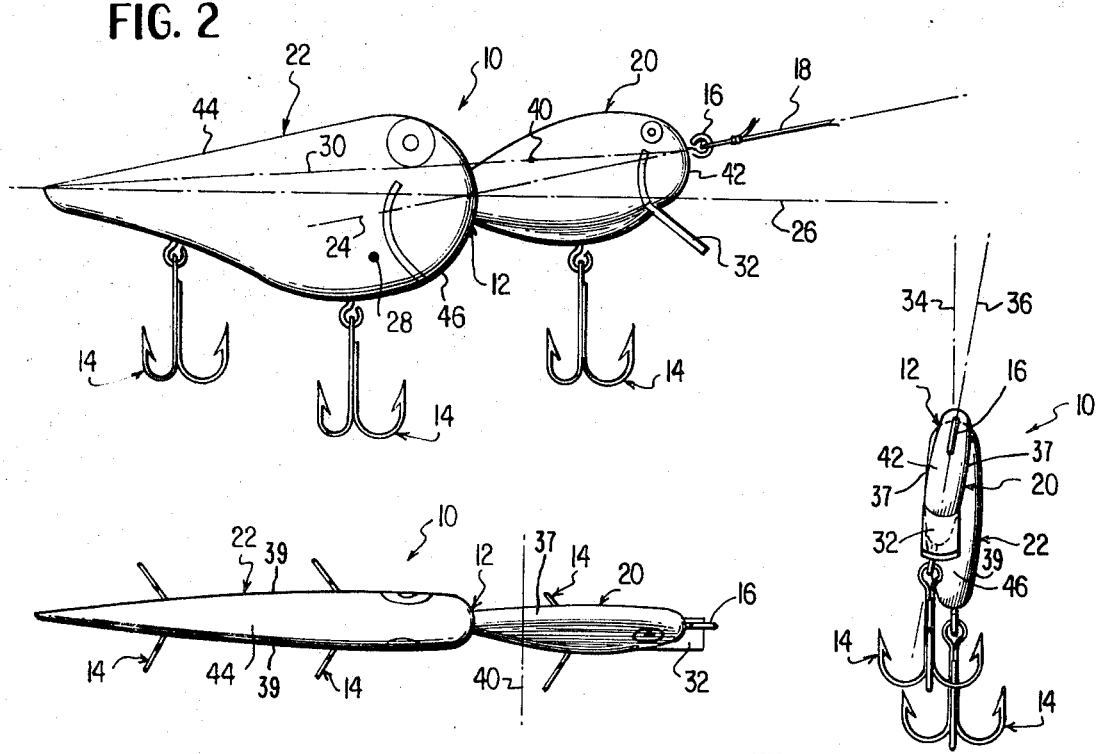
FIG. 2
FIG. 3
FIG. 4
INVENTOR
DONALD K. SMITH
BY Colton + Stone
ATTORNEYS

FISHING LURE

The design aspect of this invention is presented in Design application Ser. No. D-26,313, filed Dec. 7, 1970.

FIG. 1 is an isometric view of a fishing lure made in accordance with this invention;

FIG. 2 is a side elevational view of the fishing lure of FIG. 1;

FIG. 3 is a top view of the fishing lure of FIGS. 1 and 2; and

FIG. 4 is a front view of the fishing lure of FIGS. 1–3.

Referring to the drawing, there is shown a fishing lure 10 comprising as major components a body 12, hook means 14 thereon and means 16 for attaching the body 12 to a fishing line 18.

The body 12 comprises a first section 20 and a second larger angularly offset section 22. The first body section 20 preferably simulates a small water creature, for example a minnow. The second body section 22 preferably simulates another water creature, for example a larger minnow, in the process of devouring the smaller water creature. Thus the lure 10 presents a double hors d'oeuvre and is thereby doubly attractive to an aggressive fish sought to be caught.

As shown in FIG. 2, the first body section 20 comprises an axis 24 extending through the attachment means 16 while the second body section 22 comprises an axis 26 angularly offset from the axis 24. The axis 24 comprises part of an axis of applied tensile force defined by the attachment means 16. The axes 24, 26 define an acute angle facing below the attachment means 16. Accordingly, the body sections 20, 22 may be referred to as vertically canted, the purpose of which is more fully explained hereinafter.

The center of gravity 28 of the lure 10 is also shown in FIG. 2 and resides below a longitudinal axis 30 of the lure 10 in the second body section 22. The location of the center of gravity 28 is affected by the number and weight of the hooks attached to the body 12 which should be taken into account in preparing variations of this invention. The location of the center of gravity 28 has several effects on the operation of the lure 10 as will be more fully pointed out hereinafter. It will also be noted, particularly in FIGS. 1 and 2 that the first body section 20 comprises a downwardly inclined spoon 32 presenting a reaction surface to the water.

As shown best in FIG. 4, the first and second sections 20, 22 are generally planar and are angularly offset. A pair of planes 34, 36 intersect at the attachment means 16. The body sections 20, 22 may conveniently be described as vertically canted or angularly offset.

One feature of the invention resides in the provision of means for oscillating the body 12 about a longitudinal axis 30 thereof as suggested by the arrows 38 in FIG. 1. This oscillating means comprises angularly offset first and third reaction surfaces 37, 39 provided by the first and second body sections 20, 22 respectively in conjunction with the location of the center of gravity 28. After the lure 10 has been cast into the body of water in a conventional manner, tension is applied to the line 18 to pull the lure 10 therethrough.

As the lure 10 is pulled through the water, the body section 20 acts as a reaction surface to rotate the lure 10 in the clockwise direction in FIG. 4. Initial rotation of the lure 10 causes the reaction surface 39 to become effective thereby further rotating the lure 10 in a clockwise direction. Rotation of the lure 10 in the clockwise direction elevates the center of gravity 28 thereby creating a counterclockwise moment about the axis 30. As the body 12 is further rotated in the clockwise direction, the counterclockwise moment becomes larger than the clockwise moment thereby rotating the body 12 counterclockwise about the axis 30. The momentum in the counterclockwise direction causes the lure 10 to rotate past the position shown in FIG. 4. In so doing, the reaction surfaces 37, 39 tend to create a counterclockwise moment in the lure 10. Continued rotation of the lure 10 about the axis 30 elevates the center of gravity 28 thereby creating a clockwise moment about the axis 30. Continued counterclockwise rotation increases the clockwise moment induced in the lure 10. Soon the clockwise moment exceeds the counterclockwise force imparted by the reaction surfaces 37, 39. The lure 10 then begins clockwise rotation toward the position of FIG. 4. It will accordingly be seen that pulling the lure 10 through the water will create oscillating movement thereof about the axis 30.

Another feature of this invention resides in the provision of means for oscillating the body 12 about a transverse axis concurrently with oscillation about the longitudinal axis 30. The transverse oscillating means comprises a pair of second reaction surfaces 32, 42 on the body section 20 and fourth and fifth reaction surfaces 44, 46 respectively on the second body section 22. When the lure 10 is pulled through the water, beginning in the position shown in FIGS. 2 and 4, the shape of the reaction surfaces 32, 42, 46 is such as to introduce a clockwise moment about the axis 40 (FIGS. 2 and 3). As the lure 10 begins to rotate (or pitch downwardly) in the clockwise direction, the reaction surface 46 is masked behind the surface 32 while the reaction surface 44 is exposed above the top of the body section 20. Under this condition and since the center of gravity 28 imposes a counterclockwise moment about the axis 40, counterclockwise rotation of the lure about the axis 40 commences. As the reaction surface 46 is again exposed under the reaction surface 32 and the reaction surface 44 is masked behind the top of the body section 20, clockwise rotation of the lure 10 about the axis 40 commences. It will accordingly be seen that means are provided to oscillate the lure 10 about the transverse axis 40 upon pulling thereof through the water.

Since oscillation of the lure 10 about the longitudinal and transverse axes 30, 40, respectively, occurs simultaneously with pulling the lure 10 through the water, each of these movements provides a component of the compound motion exhibited by the lure 10. In motion, the lure 10 exhibits a realistic representation of a swimming fish.

It will accordingly be seen that there is herein provided an improved fishing lure having all of the advantages of this invention and others as may be apparent to those skilled in the art.

I claim:

1. A fishing lure comprising, a body having hook means thereon and comprising first and second rigidly connected, vertically canted sections, the lure defining a center of gravity, means on the first section for attachment to a fishing line for pulling the lure through a body of water along a path of movement, the body and attachment means defining a longitudinal axis spaced above the center of gravity, the longitudinal axis and center of gravity defining a plane, means for oscillating the body about the longitudinal axis upon body movement through the path, and means for oscillating the body upwardly and downwardly about an axis transverse to the path upon body movement therethrough;

the first body section providing first reaction surface means inclined to the plane for rotating the body in a first direction about the longitudinal axis upon body movement through the path and providing second reaction surface means for rotating the body in a first direction about the transverse axis upon body movement through the path;

the second body section providing third reaction surface means for rotating the body about the longitudinal axis in the first direction upon body movement through the path and fourth reaction surface means for rotating the body about the transverse axis in a second opposite direction upon body movement through the path, the fourth reaction surface means being masked behind the first body section until rotation of the body about the transverse axis in the first direction moves the fourth reaction surface means to a position facing the direction of movement;

the first and third reaction surface means and the center of gravity comprising the means for oscillating the body about the longitudinal axis;

the second and fourth reaction surface means comprising the means for oscillating the body about the transverse axis.

2. The lure of claim 1 wherein the third reaction surface means is substantially parallel to the plane and inoperative until inclined to the path by rotation of the first body section by the first reaction surface means.

3. The lure of claim 1 wherein the first body section is a generally flat element defining a second plane inclined to the first mentioned plane and the second body section comprises a generally flat element having a central plane substantially coincident with the first mentioned plane.

4. The lure of claim 3 wherein the first reaction surface means comprises the sides of the first body section and the third reaction surface means comprises the sides of the first body section and the third reaction surface means comprises the sides of the second body section.

5. The lure of claim 4 wherein the second reaction surface means comprises a spoon projecting forwardly and downwardly with respect to the path of movement and the fourth reaction surface means comprises an upper surface of the second body section defining with the longitudinal axis an acute angle facing in the direction of movement.

6. The lure of claim 1 wherein the attachment means defines an axis of applied tensile force and the first body section has a longitudinal axis extending in generally the same direction as the tensile force axis and the second body section has a longitudinal axis inclined to the tensile force axis and defining therewith an acute angle facing along the path of movement below the attachment means.

* * * * *